United States Patent [19]

Miller et al.

[11] 3,918,174
[45] Nov. 11, 1975

[54] GAME DEVICE

[76] Inventors: Nan C. Miller; Susie J. Murset, both of 1444 W. Cullom, Chicago, Ill. 60613

[22] Filed: Feb. 21, 1974

[21] Appl. No.: 444,327

[52] U.S. Cl.................. 35/9 R; 35/48 A; 273/139; 283/6
[51] Int. Cl.².......................................... G09B 3/08
[58] Field of Search............ 35/9 R, 9 G, 9 H, 48 A; 273/139; 283/6

[56] References Cited
UNITED STATES PATENTS

| | | | |
|---|---|---|---|
| 1,982,611 | 11/1934 | Hartnett | 35/9 R |
| 2,263,735 | 11/1941 | Kushner | 35/9 R |
| 2,410,800 | 11/1946 | Baumgartner | 35/9 R |
| 2,618,866 | 11/1952 | Adams | 35/9 G |
| 2,742,713 | 4/1956 | Villanueva | 35/9 R |
| 2,859,541 | 11/1958 | Parmenter | 35/48 A |
| 2,961,777 | 11/1960 | Neville et al. | 35/9 R |
| 2,976,620 | 3/1961 | Schoning | 35/9 R |
| 3,055,117 | 9/1962 | Bernstein et al. | 35/9 R |
| 3,223,421 | 12/1965 | Hershkowitz | 273/139 |
| 3,602,515 | 8/1971 | Seidman | 273/139 |

*Primary Examiner*—Wm. H. Grieb
*Attorney, Agent, or Firm*—Jacques M. Dulin, ESQ.

[57] ABSTRACT

A game card device for participating in a game of skill having thereon a first indicia identifying a question, a second indicia identifying possible answers to the question, a means, such as indicia, for indicating an incorrect or correct answer to the question camouflaged with a mechanically removable substance such as ink or wax, or a substance that can be activated on the card, to indicate the correctness of the answer, a third indicia identifying a prize for a correct answer, and a fourth indicia to indicate whether or not tampering with the card has occurred (such as multiple attempts to answer a single question).

10 Claims, 2 Drawing Figures

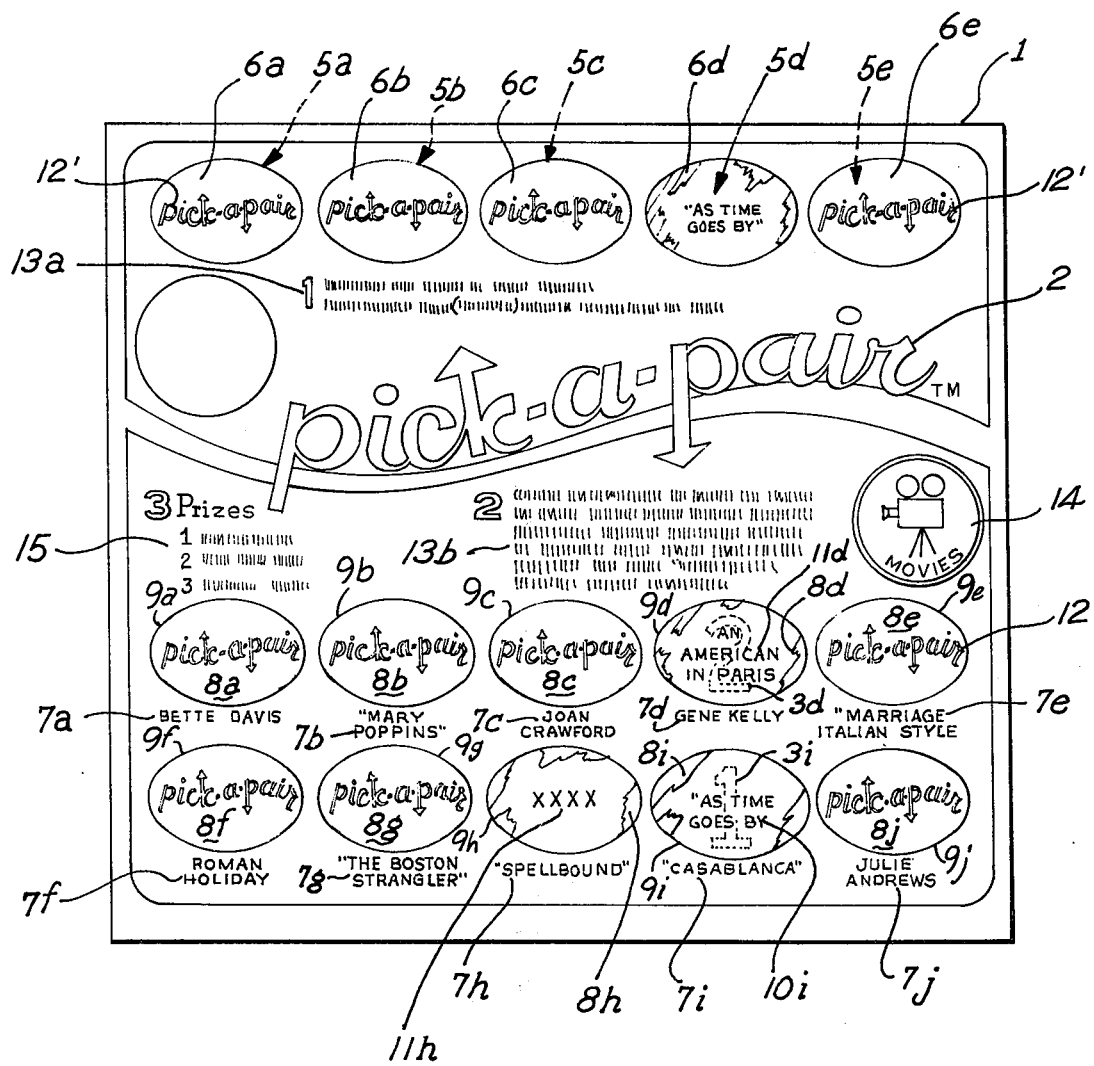

GAME DEVICE

FIELD

This invention pertains to promotional, educational and amusement devices, particularly game cards to be mass distributed by a manufacturer, distributor or retail merchandiser to purchasers in association with a game of skill that is especially suited to a promotional function.

BACKGROUND

Besides educational and amusement functions, games have an important and useful function in connection with business promotions. A standard criteria of success in the field of business promotion devices is that the promotional item, device, game, etc., increase business by 5.6 percent or more.

With respect to promotional games, card games now distributed to the general public by retail merchandisers typically involve games of chance, such as bingo or horse-race type games. Under local ordinances and regulations, such games of chance to be valid must be distributed to all members of the public without requiring a prior purchase as a condition of play. Exceptions are legal lotteries, but such lotteries are state government controlled and cannot be used by merchants to promote business. Another example of a chance-type promotion is a drawing associated with a magazine subscription drive, but which cannot require purchase of the subscription prior to obtaining the assigned number.

In contrast, games of skill are treated differently by law, permitting sponsoring merchants to require payment of a fee or purchase of an item or service as a condition precedent to participation in the game. A typical example is an entry fee for a chess match, or the like. Thus, promotional games of skill theoretically offer the possibility of a greater increase in business sales than games of chance.

However, present promotional games of skill do not achieve promotional potential since they have serious disadvantages that reduce or render ineffective sales increases. Among these disadvantages are: (1) their high cost of production, distribution, judging and prize awarding; (2) complex, ambiguous, or non self-explanatory rules that are not understood by the players; (3) improper administration of the games that transforms them into illegal games of chance; (4) very complex and slow judging procedures, including necessitating future deadlines for submitting the completed game cards for judging, sending them to distant professional judging concerns, and long waits for the judging results (i.e., they are not point-of-sale judging); (5) sponsoring merchants experience operational difficulties, including problems and expense in training personnel to handle the game distribution and redemption, security breaches (e.g., theft of, or tampering with cards), interference with normal business operations (e.g., lost personnel time, and causing customers to waste time); finally, (6) all of the above problems lead to customer complaints, and, more importantly, customer suspicion that the games are unfairly handled and judged, which suspicion may be transferred to the merchant, to his detriment.

There is therefore a need for an inexpensive game of skill device that permits immediate, foolproof, tamperproof, point-of-sale judging and prize awarding by unskilled personnel of the sponsoring merchants, and which causes no substantial operational difficulties or customer complaints while increasing sales.

OBJECTS OF THE INVENTION

It is an object of this invention to provide a game device that entails a game of skill rather than a game of chance.

It is another object of this invention to provide a game of skill device that permits immediate point-of-sale judging of the game results and awarding of the prize by the unskilled employees of the sponsoring merchant.

It is another object of this invention to provide a game-of-skill card device that is inexpensive to manufacture, distribute and administrate, without sponsor operational difficulties or customer delays in obtaining results or prizes.

It is another object of this invention to provide a game-of-skill card device that is substantially foolproof and tamperproof, and which does not give rise to customer suspicion as to the fairness in its judging.

It is another object of this invention to provide a game card device which is a game-of-skill yet which may optionally incorporate an element of chance without rendering the card illegal as an unauthorized lottery.

It is another object of this invention to provide a game card containing one or more questions and a plurality of possible answers to the questions wherein one of the possible answers is a correct answer.

It is a further object of this invention to provide a game card having camouflaged indicia associated with the answers to the given questions to indicate, when the camouflaging is activated or removed, whether the answer is a correct answer to the question by rendering the indicia visible.

It is a specific object of this invention to provide a paper game card having a plastic or hard wax coating thereon wherein the indicia indicating the correctness of a given answer is camouflaged by a readily removable coating of an opaque ink, paper, wax or the like, and the integrity of the coating is determinable by a tamper-indicating indicia overlayed thereon.

It is another object of the invention to provide a game device that can be administrated by personnel of the sponsor without special training, yet which serves to increase business at substantially low cost.

It is another object of the invention to provide a game device that can be adapted for educational or amusement purposes.

Other objects and embodiments will appear in the following detailed description of the invention.

SUMMARY OF THE INVENTION

These above needs and objects are satisfied by the present invention which is a game card device of the game-of-skill type, which includes a plurality of cooperating means comprising: separate indicia to identify at least one question; a plurality of possible answers to the question wherein one of the possible answers is correct; a means identifying each answer as to its correctness or incorrectness wherein the correctness indicia is camouflaged by a readily activated or removable substance; a prize-indicating indicia identifying the prize won when the question is answered correctly; and tamper-indicating indicia. In one embodiment, the game card device includes a plurality of questions with a set of answers for each question. In this embodiment, the prize indicated can be a function of the number of correct answers. In a second embodiment, an element of chance is introduced to the extent that the questions themselves may be camouflaged or covered by a removable substance and random selection by the player reveals the question he must answer; only one answer is correct and need be selected. In this embodiment, the prize-indicating indicia may be incorporated with the answer indicia. In this embodiment, the question-answer indicia may optionally be matching pairs of identical indicia.

The card per se can be manufactured from paper or cardboard and is provided with a relatively hard topcoat such as a polymer or hard wax coating. The camouflaging of the answer identification is accomplished by a coating of a readily removable substance such as an opaque ink, wax, a paper or plastic seal or the like.

FIGURES

FIG. 1 illustrates a first embodiment of the game-of-skill card device of this invention in which there is a set of questions and separate sets of answers directed to each question; and FIG. 2 illustrates a second embodiment of the game-of-skill card device also including an element of chance without rendering the card an illegal lottery.

DETAILED DESCRIPTION OF THE INVENTION

Figure 1:
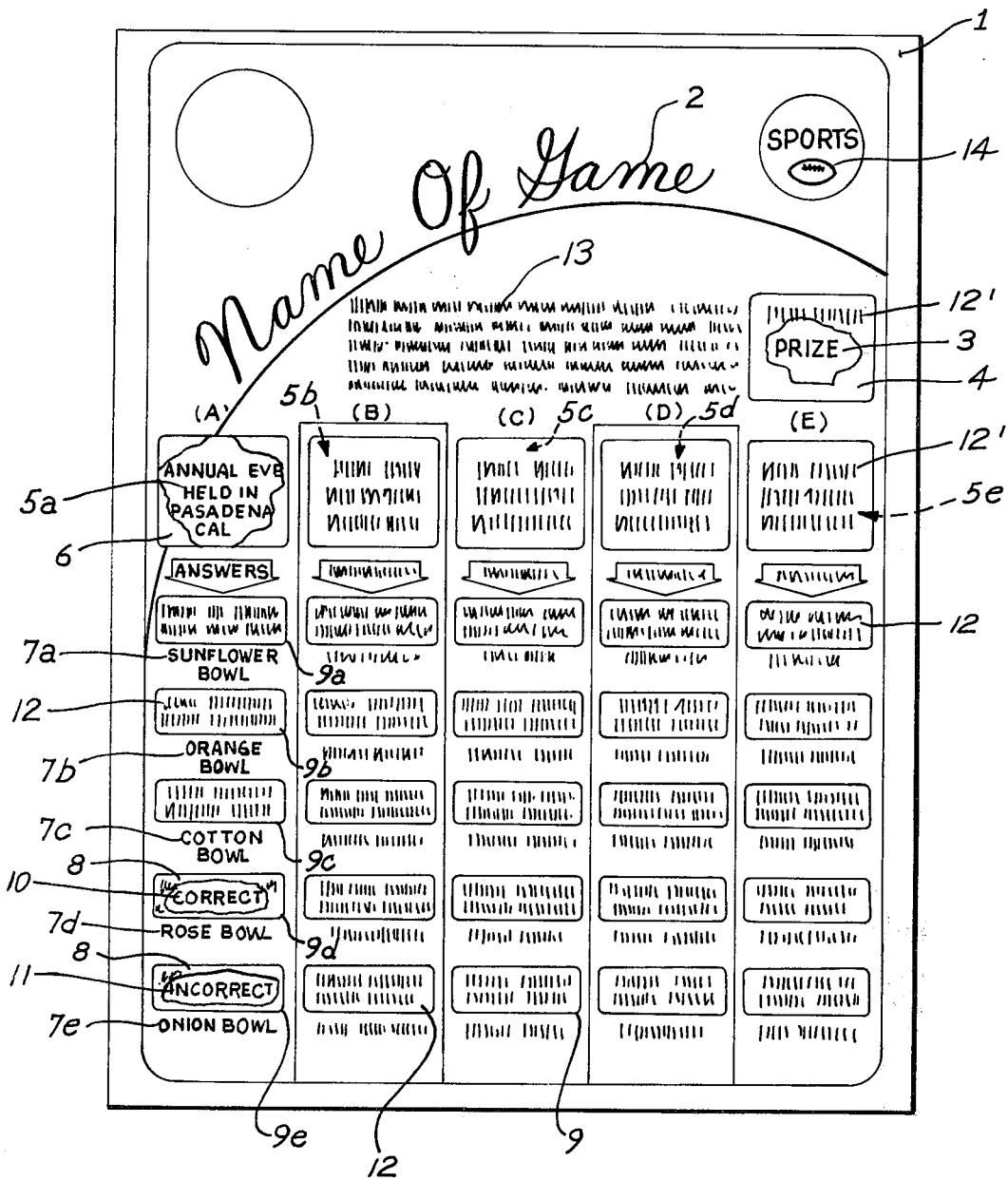

Illustrated in FIG. 1 is a game card 1 according to a first embodiment of the present invention. The basic card 1 is manufactured from a thick sheet of paper and has a thin coating of a hard wax or plastic on the face thereof.

In particular, game card 1 has an identifying title or name 2 and instructions 13 imprinted on the top or back portion of the card. A horizontal row of five questions 5a–e, each having five possible answer choices 7a–e positioned below each question, are imprinted in columns A, B, C, D and E. Each answer choice 7a–e has associated therewith an answer designation area 9a–e which includes either an imprinted correct designation 11 or an incorrect designation 10 (such as the word "incorrect," "scratch," a pictograph or the like) covered by a readily removed opaque ink or wax-like topcoat 8. The coating on the paper prevents the ink topcoat 8 from penetrating into the paper sheet whereby the ink is readily removed from the card by scraping to expose the correctness or incorrectness of a given answer.

Tamper indicia 12 is preferably imprinted on the surface of ink topcoat 8 and comprises print, script or an elaborate design which is not readily duplicated. Tamper indicia 12 identifies whether a given answer was selected for a question and is present to frustrate attempts to cover up or conceal an attempted incorrect answer.

An opaque ink or wax-like topcoat 6 is also provided over question 5 to conceal the questions contained on a given card until the card is distributed to a purchaser. The questions may also have a tamper-proof indicia 12 thereover.

A prize-indicating indicia 3 having an ink topcoat 4 may be imprinted on the face of the card. A category indicia 14 may also be imprinted on the face of the card to indicate the broad scope of questions 5. The prize indicia may be a picture of the prize won, words describing it, or a number indicating a single category or selection from among several prizes identified elsewhere on the front or back of the card, or the like. Tamper-proof indicia 12 may be used.

The game card 1 of the present invention is utilized by first scratching off the ink 6 camouflaging question 5 in column A with a coin or fingernail. The questions are initially covered so there can be no attempt by the player to select among several cards for the "easiest" set of questions on a single card. This construction promotes the nature of the game as one of skill. Once the question is exposed, the answers 7a–e are reviewed. Then ink overcoat 8 is scraped off the one answer designation area 9a–e associated with the one answer among 7a–e considered by the player to be correct, to expose the correct designation indicia 10. If the question is incorrectly answered, the incorrect designation indicia 11 will appear when ink overcoat 8 is removed from answer designation area 9e. For example, referring to the specific example appearing in column A, the annual event held in Pasadena, Calif. is the Rose Bowl 7d as indicated by the "correct" indicia designation 10 appearing upon removal of layer 8 from area 9d. If the question had been incorrectly answered Onion Bowl, the incorrect designation 10 would appear. Any time an incorrect designation 11 appears in a column, the player and the non-skilled person administrating the game knows that question was "lost."

The game card construction is thus foolproof, easily administrated, and takes little time to judge. Customer-player faith in judging is high, and sponsor cost for distribution is low and operational difficulties minimized.

The prize 3 awarded a given contestant can be a function of the number of questions correctly answered. For example, a single prize can be awarded for getting a minimum number of questions right such as one, two, three, four, or five out of five. Alternatively, several prizes can be contained under ink or wax overcoat 4, each prize being a function of a given number of correct answers.

FIG. 2 shows a second embodiment of the game card device of this invention in which an element of chance is introduced without rendering the device in violation of local laws, since overall it remains a game of skill device. Card device 1 has a name indicia 2 appropriately placed thereon, and a category indicia 14 indicating the general category to which all the questions 5a–e apply. Instruction indicia 13a and 13b are simple and placed on the card associated with the indicia to which they apply. Typically, the player receives a card after purchase of an item at the store of the sponsoring merchant. In this embodiment the element of chance is introduced by the fact that the player selects only one question from among the five possible questions 5a–e. However, the player cannot choose the one to which he knows the answer since each is overcoated with concealing wax 6 and tamper indicia 12. The card 1 may have questions of various degrees of difficulty hidden under wax overcoats 6a–e, and each different degree of difficulty may have a different prize value category associated therewith. Which degree of difficulty of question and corresponding value of prize is a matter of chance, i.e., which question is chosen by the player.

In the example illustrated in FIG. 2, the player has chosen question 5d and exposed it by removing wax 6d. Then, pursuant to instructions 13b the player reviews the 10 answer choices 7a–j, and removes the wax topcoat 8 from the chosen answer designation area 9a through 9j to indicate a correct designation 10 or an incorrect designation 11d or 11h. In this illustration, the correctness of the answer is indicated by answer correctness indicating indicia 10i being identical to the question 5d. Simultaneously, prize category indicia 3i is revealed, here as a reverse color indicia associated with the answer. Tamper indicating indicia 12 are also placed on the answer correctness indicating indicia overcoats 8.

Where the answer is wrong, as 11d or 11h, it does not match the question 5d. However, the answer 11d may be correct for an unchosen question 5a–c and 5e, or there may be no corresponding question, as indicated by wrong indicia "xxxx" 11h, or other means, e.g., absence of any indicia. In the embodiment shown, there are five correct answers, one for each of the five questions under the ten areas 9a–j, and five indicia that are incorrect for all the questions. In the embodiment shown, correctness of indicia 10i as compared to 11d is shown by the fact that 10i indicia matches the indicia 5d. The example shown illustrates a pair matching type game-of-skill device. As shown, the song "As Time Goes By," 5d, was in the film "Casablanca," 7i, rather than in "Spellbound," 7h, nor was it sung by Gene Kelly, 7d.

When indicia 10i indicates a correct answer, the prize indicia 3i is simultaneously revealed. The prize indicia may be a pictograph of the prize, a word indicating the prize, or a number corresponding to a prize type or category among a list of prizes. In this embodiment, the prize 3i is indicated as a category number. The prize is indicated, for example, by indicia 15, which may be a catgory identification list on the front or back of the card. The prize values or their categories are correlated with the difficulty of the questions.

The questions and answers may be arranged in any suitable manner. The type of questions, numbers required to be answered, degree of difficulty, type of indicia (pictograph, number, lettering or combinations), and type of prizes may be selected to best suit the promotional, educational, or amusement purpose.

EXAMPLE

The unexpectedly improved results of this invention are shown by results from a test marketing of a card device of the type shown in FIG. 1. One million game card devices were prepared in accord with the invention for a test market area covering parts of four states. The cards were provided to local franchisees of a fast food chain. Cards were expected to last a minimum of 8 weeks. Purchases were required as a condition precedent to obtaining the card, and various food items were given as the prizes, depending on the difficulty of the questions (cards). Prizes were given upon redemption of the correct cards. The object was to increase sales by 5.6 percent, and the franchise management were not confident such an increase would be obtained. The cards, however, were completely gone in 6 weeks, and sales increased in excess of 30 percent. Approximately 15 percent of the cards were redeemed as correct indicating the difficulty of the questions. The chain reported the cards were its most successful promotion ever. Substantially no operational difficulties were encountered, and unskilled franchisee staff were able to handle card distribution, verification (judging), and prize distribution without time-consuming and expensive training or diversion from normal customer service.

The educational nature of the game is also illustrated by the fact that card recipients took the cards home and researched the answers. The cards were not required to be returned immediately, but an expiration date was employed, in part so test marketing results could be evaluated. By being able to study for the answers and return later to redeem correct cards, repeat business was stimulated. Further, a secondary market sprang up, with youngsters trading the cards before turning them in prior to the expiration date for prizes.

It should be understood that various modifications within the scope of this invention can be made by one of ordinary skill in the art without departing from the spirit thereof. For example, the respective prize, answer and question indicia illustrated by an ink topcoat on a polymer or hard wax coating could be any pressure or scrape activated system such as imbedded microencapsulated ink spheres as used in "carbonless" carbon paper or superimposed paper layers having positioned therebetween a wax layer that becomes discernible by rubbing the top surface of the paper with a coin. We therefore wish our invention to be defined by the scope of the appended claims as broadly as the prior art will permit and in view of this specification if need be.

We claim:

1. A game card device for participating in a game of skill which comprises:
   a. a supporting sheet having disposed thereon;
   b. a first indicia identifying a question;
   c. a first opaque layer overlying and camouflaging said question-identifying indicia;
   d. said first opaque camouflaging layer overlying said question-identifying indicia being adapted to selectively render readily visible said question-identifying indicia;
   e. second indicia identifying a plurality of possible answers to said question which includes a correct answer and at least one incorrect answer;
   f. third indicia indicating whether the answer selected to the question is correct or incorrect;
   g. a second opaque layer overlying and camouflaging said third answer correctness-indicating indicia;
   h. said second opaque camouflage layer being adapted to selectively render readily visible said indicating indicia to permit immediate ascertainment of the correctness or incorrectness of said answer;
   i. a fourth indicia overlying at least one of said opaque camouflaging layers adapted to indicate conditions of integrity thereof.

2. A game card as in claim 1 which includes:
   j. a fifth indicia identifying a category for the questions.

3. A game card as in claim 1 which includes a plurality of first indicia identifying a plurality of questions.

4. A game card device as in claim 1 which includes:
   k. a sixth, prize-indicating indicia.

5. A game card device as in claim 4 which includes:
   l. third opaque layer overlying and camouflaging said sixth, prize-indicating indicia.

6. A game card device as in claim 4 wherein said sixth, prize-indicating indicia identifies at least one of several possible prizes.

7. A game card device as in claim 6 wherein said sixth, prize-indicating indicia is a number.

8. A game card device as in claim 1 wherein said first, question-identifying indicia and said answer correctness-indicating indicia are substantially identical.

9. A game card device as in claim 1 wherein said first, question-identifying indicia is in the form of a pictograph.

10. A game card as in claim 1 wherein said opaque layers comprise at least one printed layer containing an opaque ink.

* * * * *

UNITED STATES PATENT AND TRADEMARK OFFICE
CERTIFICATE OF CORRECTION

PATENT NO. : 3,918,174
DATED : November 11, 1975
INVENTOR(S) : Nan C. Miller and Susie J. Murset It is certified that error appears in the above-identified patent and that said Letters Patent are hereby corrected as shown below:

Column 3, line 61, the number "12" should be --12'--.

Column 4, line 3, the number "12" should be --12'--.

Column 4, line 56, the number "12" should be --12'--.

Column 6, line 43, the word "third" should be --third,--.

Signed and Sealed this eighth Day of June 1976

[SEAL]

Attest:

RUTH C. MASON
*Attesting Officer*

C. MARSHALL DANN
*Commissioner of Patents and Trademarks*